J. DEMAREST.
Valve for Water-Closets.
No. 213,324. Patented Mar. 18, 1879.
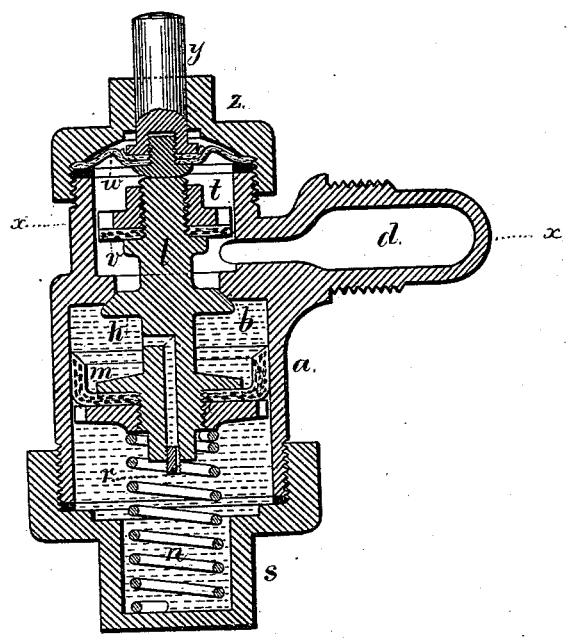
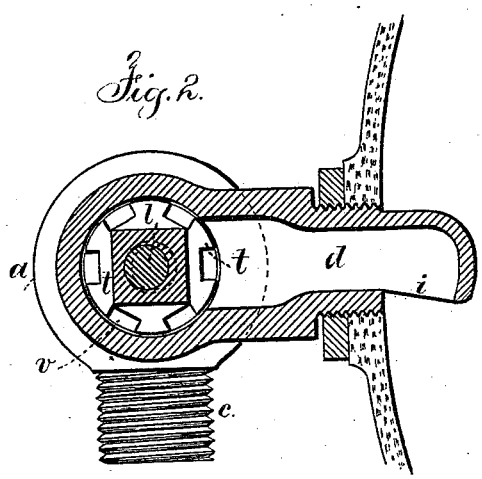
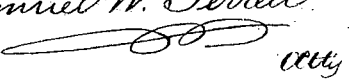

UNITED STATES PATENT OFFICE.

JOHN DEMAREST, OF NEW YORK, N. Y.

IMPROVEMENT IN VALVES FOR WATER-CLOSETS.

Specification forming part of Letters Patent No. 213,324, dated March 18, 1879; application filed January 18, 1879.

*To all whom it may concern:*

Be it known that I, JOHN DEMAREST, of the city and State of New York, have invented an Improvement in Valves for Water-Closets, of which the following is a specification:

This valve is especially intended for hopper-closets, in which the valve is operated by the movement of the seat as depressed by the weight upon it.

The valve-case has a hollow arm with a deflecting tubular mouth, for causing the water to issue in one direction and run around the interior of the hopper, and thoroughly wash the same. This is to be distinguished from the deflecting-plate heretofore employed in closets of this kind, in which the water is directed both ways, and, meeting at the opposite side of the hopper, often spouts upwardly, to the annoyance of the person seated on the closet.

I also construct the valve and its guide so as to limit the movement in opening, and also to stop the flow of water while the seat is depressed.

In the drawings, Figure 1 is a vertical section of the valve as attached to one side of the closet-hopper; and Fig. 2 is a horizontal section of the same at the line $x\ x$.

The valve-case $a$ has a valve-seat, $b$, between the inlet water-way $c$ and the hollow arm $d$ that conveys water to the closet. This arm $d$ passes or screws into a hole in the side of the closet hopper or trunk, and is secured by a nut or lock-nut; and the end of the arm projecting within the hopper is made with a tubular side opening or mouth, $i$, the face of which is not in a radial plane to the hopper, but it is at a backward inclination, so that the water, as it issues, will be directed against the interior of the hopper or container, and run around the same with sufficient swiftness to thoroughly cleanse the surface.

The valve $h$ is upon a stem, $l$, with a piston and cup-leather, $m$, that is within the variable water-chamber in the case $a$, and the spring $n$ closes the valve gradually as the water passing into the said variable chamber allows the piston and valve to rise.

A hole through the stem $l$ terminates with a screw-plug, $r$, that has one side partially removed. By adjusting this screw the water is allowed to pass either faster or slower into the said chamber and determine the time that is occupied by the valve in closing. The spring $n$ is within a recess in the movable bottom head $s$.

Upon the upper part of the valve-spindle there is a guiding-nut, $t$, that is of a size to move freely within the valve-case $a$ and retain the valve in a central position. The edges of this nut are notched, so as to allow the water to pass freely; and, when desired, a leather or rubber washer, $v$, is employed beneath this nut, to close down upon the upper side of the valve-seat and check the flow of the water while the closet-seat is depressed and the valve $h$ is not resting upon its seat.

By this construction the nut $t$ forms a stop to arrest the downward movement of the valve, and the movement of the valve is determined by the position of this nut upon the stem. If the nut is screwed upwardly the distance between the same and the valve will be increased, and the valve will be moved farther as it is opened before the nut arrests the movement by coming into contact with the seat. The greater the movement of the valve, the longer time will be consumed in closing it, because the piston $m$ has also to travel farther, and the speed of that is limited by the water passing into the variable chamber.

The elastic diaphragm $w$ and pusher $y$ are provided, as usual, with the cap $z$, and serve to give end motion to the valve-stem when the closet seat is depressed upon the pusher.

I claim as my invention—

1. The combination, with the water-closet and its valve, of a hollow arm, $d$, at one side of the valve-case $a$, passing through the water-closet hopper and secured to the same, and having a tubular mouth, $i$, at one side, for the purposes and as set forth.

2. The piston, variable chamber, valve, and seat in a water-closet valve, in combination with the nut $t$ on the valve-stem, that forms a stop upon the seat to determine the movement of the valve and piston in opening, substantially as specified.

Signed by me this 15th day of January, A. D. 1879.

JOHN DEMAREST.

Witnesses:
 GEO. T. PINCKNEY,
 HAROLD SERRELL.